United States Patent [19]
Orsino et al.

[11] Patent Number: 5,113,363
[45] Date of Patent: May 12, 1992

[54] METHOD AND APPARATUS FOR COMPUTING ARITHMETIC EXPRESSIONS USING ON-LINE OPERANDS AND BIT-SERIAL PROCESSING

[75] Inventors: Francesco Orsino, North Babylon; Chung-Tao D. Wang, Melville, both of N.Y.

[73] Assignee: AIL Systems, Inc., Deer Park, N.Y.

[21] Appl. No.: 664,525

[22] Filed: Mar. 5, 1991

Related U.S. Application Data

[63] Continuation of Ser. No. 458,778, Dec. 29, 1989, abandoned.

[51] Int. Cl.⁵ .............................................. G06F 7/38
[52] U.S. Cl. ................................. 364/736; 364/759
[58] Field of Search ............... 364/754, 759, 760, 736, 364/786

[56] References Cited

U.S. PATENT DOCUMENTS

| | | | |
|---|---|---|---|
| 4,575,812 | 3/1986 | Kloker et al. | 364/760 |
| 4,594,678 | 6/1986 | Uhlenhoff | 364/736 |
| 4,638,449 | 1/1987 | Frey | 364/760 |
| 4,852,037 | 7/1989 | Aoki | 364/736 |
| 4,890,127 | 12/1989 | Darley | 364/786 |

OTHER PUBLICATIONS

Design and VLSI Implementation Of An On-Line Algorithm, by D. Ercegovac, et al., vol. 698 Real Time Signal Processing IX (1986), Society of Photo Optical Instrumentation Engineers (SPIE), p. 92.
A General Method For Evaluation Of Functions And Computations In A Digital Computer, by Milos Dragutin Ercegovac, Jul., 1975, Library of the University of Illinois, Microfilm No. 76-6758.

Primary Examiner—Gary V. Harkcom
Assistant Examiner—Tan V. Mai
Attorney, Agent, or Firm—Hoffmann & Baron

[57] ABSTRACT

Method and apparatus for processing on-line operands A, B and C to produce the arithmetic expression $S=(A \times B)+C$. In general, the apparatus includes an input processing unit, an on-line multiplication unit, and an on-line serial addition unit. The input processing unit is sequentially introducing the digits of operands, A, B and C into the apparatus, where each digit is represented in a redundant binary number format. The multiplication unit multiplies the sequence of digits of the operands A and B to produce the n-th product digit $p_n$ of the product $P=A \times B$, with the most significant digit $p_o$ being computed first. The on-line addition unit adds the n-th product digit to the n-th digit of on-line operand C, so as to produce the n-th digit $s_n$ of the arithmetic expression $S=(A \times B)+C$, with the most significant digit $s_o$ being produced first. In one embodiment, the input processing unit includes a selective conversion subunit for selectively converting the digits of operands A, B and C sequentially entering the computational device, so that each digit is represented in a redundant number format. In such an embodiment, the redundant binary number format is characterized by signed digit numbers, and the selective conversion subunit includes a binary-to-signed digit converter.

8 Claims, 10 Drawing Sheets

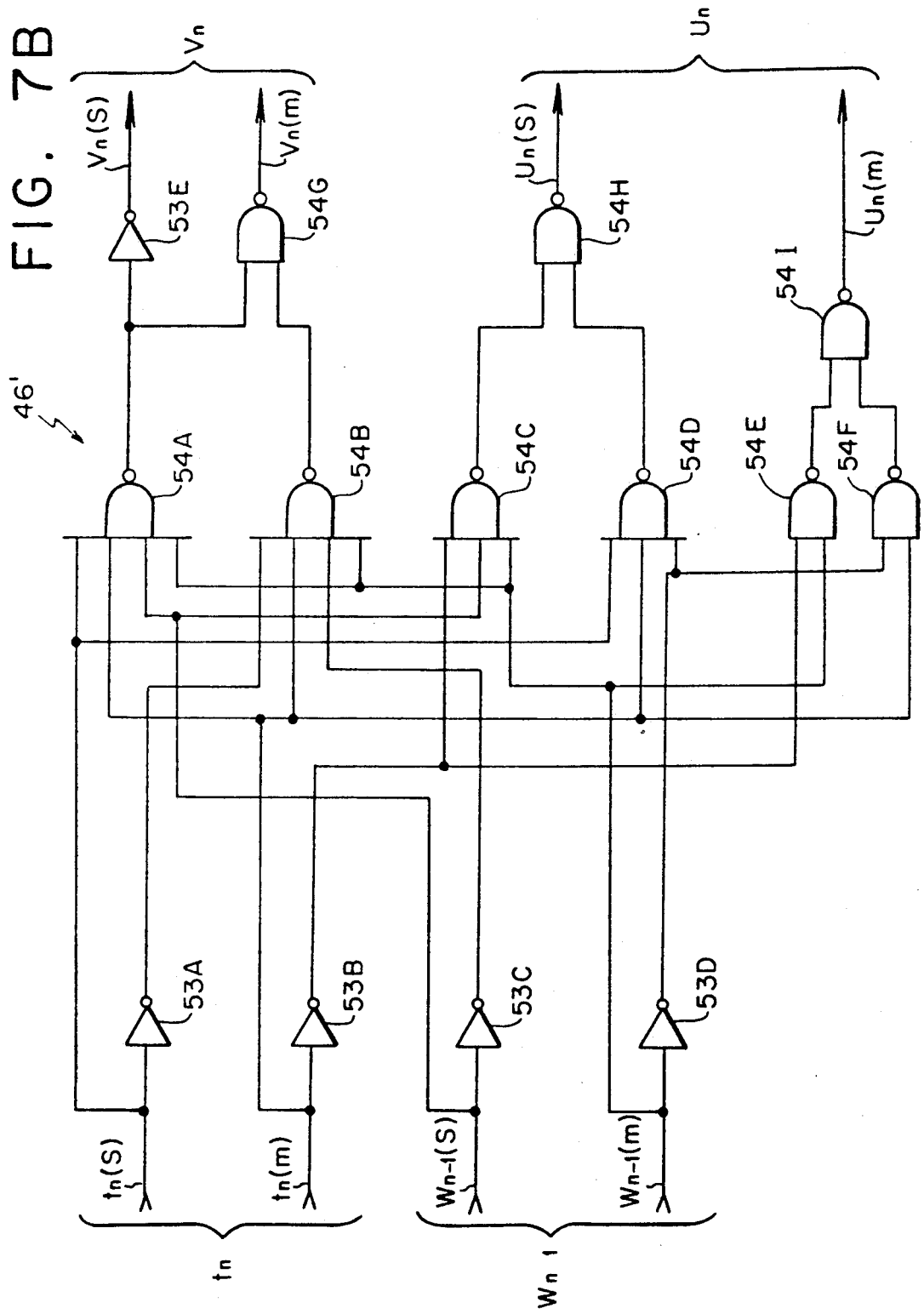

METHOD AND APPARATUS FOR COMPUTING ARITHMETIC EXPRESSIONS USING ON-LINE OPERANDS AND BIT-SERIAL PROCESSING

This is a continuation of copending application Ser. No. 07/458,778 filed on Dec. 29, 1989, now abandoned.

BACKGROUND OF THE INVENTION

1. Field of Invention

The present invention relates generally to methods and apparatus for bit-serial processing operands in a computational-based device, to produce the value of arithmetic expressions. More particularly, the present invention relates to a method and apparatus for bit-serial processing the operands A, B and C in a computational device, to produce the value of the arithmetic expression $S=(A \times B)+C$ where each operand A, B and C are expressed as a sequence of digits, with the most significant digit of each operand entering the computational device first, and the most significant digit of the arithmetic expression $S=(A \times B)+C$ being produced first.

2. Description of the Prior Art

There is a great need to compute basic arithmetic expressions such as $(A \times B)+C$, where operands A, B and C are digitally represented as a sequence of digits of binary value. The reason for this need is quite simple. Most computational functions and digital signal processing techniques (e.g. digital finite impulse response (FIR) filters, discrete Fourier transforms (DFT), discrete Walsh transforms (DWT), discrete Hartley transforms (DHT), matrix-vector multiplication and the like), are realizable as a particular combination of arithmetic units (i.e. "building blocks"), each carrying out the arithmetic function $(A \times B)+C$.

In this regard, "computational efficiency" and speed with which the arithmetic expression $(A \times B)+C$ can be computed in a computational-based device, is most important, especially in demanding signal processing applications.

In methods and apparatus involving the simultaneous processing of a set of digits (i.e. a word), hereinafter referred to as "word-parallel processing", the arithmetic expression $(A \times B)+C$ can only be computed upon the simultaneous availability of all of the digits of the operands A, B and C. Consequently, such methods and apparatus suffer from several significant shortcomings and drawbacks. In particular, evaluation of the arithmetic expression $(A \times B)+C$ cannot be undertaken until all of the digits of the operands are available. As a result, such word-parallel processing methods and apparatus are undesirable for particularly demanding real-time signal processing applications. Also, additional digit storage requirements and processing time are needed to implement such word-parallel processing techniques.

In response to the shortcomings and drawbacks of the above-type "word-parallel" processing methods and apparatus, several "bit-serial" processing methods and arithmetic processors have been proposed.

One particular "bit-serial" processing technique involves computation of the arithmetic expression $(A \times B)+C$ by providing one digit of each operand A, B and C at a time, to produce in a digit-by-digit manner, the value of $(A \times B)+C$ starting from the least significant digit (LSD). Such a method, however, has several significant shortcomings and drawbacks. In particular, the data word length of the result $(A \times B)+C$ is doubled whenever a multiplication operation is performed. Thus, since the output therefrom must be truncated to a fixed word length, the computation time used to produce the second half of the product is wasted in a computational sense. In addition, such a method of bit-serial processing commences from the least significant digit (LSD) of the operand, which normally is not available first from the analog-to-digital converter employed in sampled-signal processing applications. Consequently, additional storage and processing time are needed to implement such bit-serial processing methods, commencing from the least significant digit (or bit).

An alternative bit-serial processing method and arithmetic processor is disclosed in a paper entitled "Design and VLSI Implementation of an On-Line Algorithm" by D. Ercegovac et al., published in Vol. 698 Real Time Signal Processing IX (1986) of The Society of Photooptical Instrumentation Engineers (SPIE). Therein, Ercegovac et al. propose an "on-line", bit-serial method and arithmetic processor for computing the arithmetic expression $(A \cdot X)+B$, which is mathematically equivalent to the above-described expression $(A \times B)+C$. In Ercegovac et al.'s bit-serial processing method and arithmetic processor, operands A and X are available "on-line" and are expressed in a radix-2 signed-digit format with the most significant digit provided to the arithmetic processor first, whereas operand B is available "off-line" (word-parallel) in a two's complement format.

In "on-line" computational processes of the type disclosed in Ercegovac et al.'s above-referenced paper, the operands A and X, as well as the results of any arithmetic operation involving the same, flow through the arithmetic processor in a digit-by-digit manner, starting with the most significant digit. In order to generate the j-th digit of the result (e.g. $(A \cdot X)+B$), $j+\delta$ digits of the corresponding operands A and X are required, where $\delta$, the on-line delay, is usually a small integer. As soon as $\delta$ input digits are available, then successive operations are executed in an overlapped manner in such bit-serial arithmetic processors.

In order that the arithmetic can be carried out from left-to-right (contrary to conventional right-to-left arithmetic methods) and thus be capable of computing the value of the arithmetic expression $(A \cdot X)+B$ starting from the most significant digit, a redundant binary number system is employed in the Ercegovac et al. bit-serial processing method and arithmetic processor. While the format of output data digits must be in the signed-digit form, and consequently the input format into each arithmetic processor of Ercegovac et al. must subsume the signed-digit form, all internal arithmetic operations are executed in regular binary representation (e.g. two's complement form). Thus, input operands A, X and B must be converted "on-the-fly" from signed-digit form into two's complement form.

The on-line method and arithmetic processor of Ercegovac et al. has several advantages over all bit-parallel and most other bit-serial types of processing, namely:

(i) computation of the expression $(A \cdot X)+B$ can commence when the most significant digit of a signal sample is available from the analog-to-digital converter, thereby improving the arithmetic processor throughput by a factor of N, where N is the number of digits from the analog-to-digital converter;

(ii) truncation of the output of the processor's digital multiplier occurs at a fixed time interval, in order to maintain a constant word length, thereby improving the processor throughput by a factor of two (2) since the second half or least significant word of the product (A·X) is not performed; and (iii) commencement of the second stage of computation in a computational-based device (configured from such an arithmetic processor), can begin whenever the most significant digit of the first output therefrom is available, and commencement of a third stage of computation in such a computational-based device, can begin as soon as the most significant digit of the second stage output is available, and so on for subsequent stages. Thus, by overlapping the computation of successive digits of operands, a significant improvement in the overall processor can be achieved.

However, the method and arithmetic processor of Ercegovac et al. suffer from several significant shortcomings and drawbacks.

In the Ercegovac et al. arithmetic processor, only two operands (i.e. A and X) can be "on-line", and the third operand B must be present in "off-line" (i.e. bit-parallel or digit-parallel) form. Consequently, the input-output requirements of any arithmetic processor realizing the Ercegovac et al. method are substantially large and for the most part are not minimizable.

Also, the Ercegovac et al. arithmetic processor when employed in constructing digital (FIR) filters, results in a digital filter characterized by relatively slow data throughput because all of the digits of operand C in the expression (A × B) + C must be simultaneously available to produce the resulting arithmetic expression.

In view, therefore, of the shortcomings and drawbacks of prior art methods and apparatus for arithmetic processing, there is a clear need in data processing arts for a method and apparatus for bit-serial processing operands available in an on-line fashion, so as to provide in computationally efficient and high-speed manner, the value of the arithmetic expression (A X B) + C, starting from the most significant digit first.

OBJECTS OF THE INVENTION

Accordingly, it is a primary object of the present invention to provide a method and apparatus for processing in a bit-serial manner, the operands A, B and C which are all available on an "on-line" basis (most significant bits thereof being provided to the computational device first), so as to produce the value of the arithmetic expression (A X B)+C=S, with the most significant digit thereof so being generated first from the computational device.

It is a further object of the present invention to provide such a method and apparatus, wherein on-line operands A, B and C can be expressed in either regular binary format or in a redundant system of number representation. However, regardless of the input data format, all internal "arithmetic operations" are carried out using numbers expressed in a "redundant" number format. As a result, the dynamic range of the method and apparatus is independent of the processing time and throughput.

A further object of the present invention is to provide such a method and apparatus in which high-throughput computation is provided and carry-propagation is restricted to adjacent digits. As a result, arithmetic can be carried out from the left, starting from the most significant digit.

A further object of the present invention is to provide such apparatus in the form of a high-speed arithmetic processor which requires a minimal number of input and output pins (i.e. terminals) and which can be cascaded together to construct an arithmetic processor capable of computing one of a variety of arithmetic expressions or executing one or more of a wide variety of signal processing operations.

Yet a further object of the present invention is to provide such an arithmetic processor which includes a built-in test circuit that generates pre-determined sequences as inputs, and compares the computed output with the expected output to determine the performance of the arithmetic processor.

According to one aspect of the present invention, a method and apparatus are provided for processing on-line operands A, B and C, in a computational device, to produce the value of the arithmetic expression $S=(A \times B)+C$. In the method of the present invention, each operand A, B and C is expressed as a sequence of digits represented by $(a_0, a_1, \ldots a_n \ldots, a_{N-1})$, $(b_0, b_1, \ldots b_n \ldots, b_{N-1})$ and $(c_0, c_1, \ldots c_n \ldots, c_{N-1})$ respectively, with equal word length N, and where the most significant digit $a_0$, $b_0$ and $c_0$ of each operand enters the computational device first.

In general, the processing method of the present invention comprises sequentially introducing the digits of the operands A, B and C into the computational device, with each digit being represented in a redundant binary number format. Then, using an on-line multiplication process, the sequence of digits of the operands A and B are multiplied to produce the n-th product digit $p_n$ of the product $P=A \times B$, with the most significant digit $p_0$ being computed first from the on-line multiplication process. Then using an on-line serial addition process, the n-th product digit is added to the n-th digit of operand C, so as to produce the n-th digit $s_n$ of the arithmetic expression $S=(A \times B)+C$ where the most significant digit $s_0$ is produced first. In the application where each operand has a word length equal to N digits, the method of the present invention comprises repeating the above steps N times so as to produce the complete value of the arithmetic expression $S=(A \times B)+C$.

In the preferred embodiment, the on-line serial addition process involves the following sequence of steps. First, the n-th product digit $p_n$ is serially added to the n-th digit of operand C, i.e. $c_n$, so as to provide a first pair of partial sums represented, for example, by $w_n$ and $t_n$, respectively. The partial sum $w_n$ is then delayed by one digit interval, and then a second pair of partial sums $u_n$ and $v_n$, respectively, are generated. The partial sum $u_n$ is delayed by one digit interval, and then the total sum is generated as a function of the delayed partial sum $u_n$ and the partial sum $v_n$.

The present invention also provides apparatus for processing on-line operands A, B and C to produce the arithmetic expression $S=(A \times B)+C$ in accordance with the method of the present invention. In general, the apparatus comprises an input processing means, a conventional on-line multiplication means, and an on-line addition means. The input processing means is for sequentially introducing the digits of operands A, B and C into the apparatus, where each digit is represented in a redundant binary number format. The multiplication means multiplies the sequence of digits of the operands A and B to produce the n-th product digit $p_n$ of the product $P=A \times B$, with the most significant digit $p_0$ being computed first. The on-line addition means adds the n-th product digit to the n-th digit of on-line operand C, so as to produce the n-th digit $s_n$ of the arithmetic expression $S=(A\times B)+C$, with the most significant digit $s_0$ being produced first.

In the preferred embodiment, the input processing means comprises a selective conversion means for selectively converting the digits of operands A, B and C sequentially entering the computational device, so that each digit is represented in a redundant number format. In such an embodiment, the redundant binary number format is characterized by signed digit numbers, and the selective conversion means comprises a binary-to-signed digit converter. Also, the input processing means preferably includes a word-length control means for restraining the word length of the operands and intermediate words to a predetermined limit.

In a preferred embodiment, the apparatus is realized in the form of an arithmetic processor, which in addition to the input processing means, on-line multiplication means, and the on-line addition means, also includes an arithmetic test performance means for determining whether or not the arithmetic processor is functioning properly. In general, this arithmetic test performance means comprises a self-test data generator, and self-test data check logic for comparing the expected result of a test pattern injected into the arithmetic processor and the actual result from the on-line addition unit, and determining whether or not the performance of the processor either passes or fails.

As a result of the present invention, it is now possible to construct an arithmetic processing chip capable of bit-serial processing, input operands which are all in on-line form. Also, it is now possible to construct such a high-speed arithmetic processing chip having a minimal amount of input and output requirements (e.g. pins).

These and other objects, features and advantages of this invention will be apparent from the following detailed description of illustrative embodiments thereof, which is to be read in connection with the accompanying drawings.

BRIEF DESCRIPTION OF THE DRAWINGS

FIGS. 7A, 7B and 7C are schematic diagrams showing logical circuitry used in implementing the logic functions of logic units A, B and C, respectively, of the on-line serial addition unit of the present invention.

DETAILED DESCRIPTION OF THE PREFERRED EMBODIMENTS

In general, while the method of the present invention can conceivably be realized in a variety of computational based devices producing complex arithmetic expressions, one method of the preferred embodiments hereof is realized in the form of an arithmetic processing unit capable of producing the value of the arithmetic expression $S=(A\times B)+C$. Notably, each operand A, B and C is expressed as a sequence of digits, with the most significant digit of each operand entering the arithmetic processing unit first, and the most significant digit of the arithmetic expression $S=(A\times B)+C$ being produced first. As will be discussed in greater detail hereinafter, more complex arithmetic expressions can be produced by cascading two or more arithmetic processing units of the present invention, with each stage carrying out the basic arithmetic expression $S=(A\times B)+C$.

Figure 1:
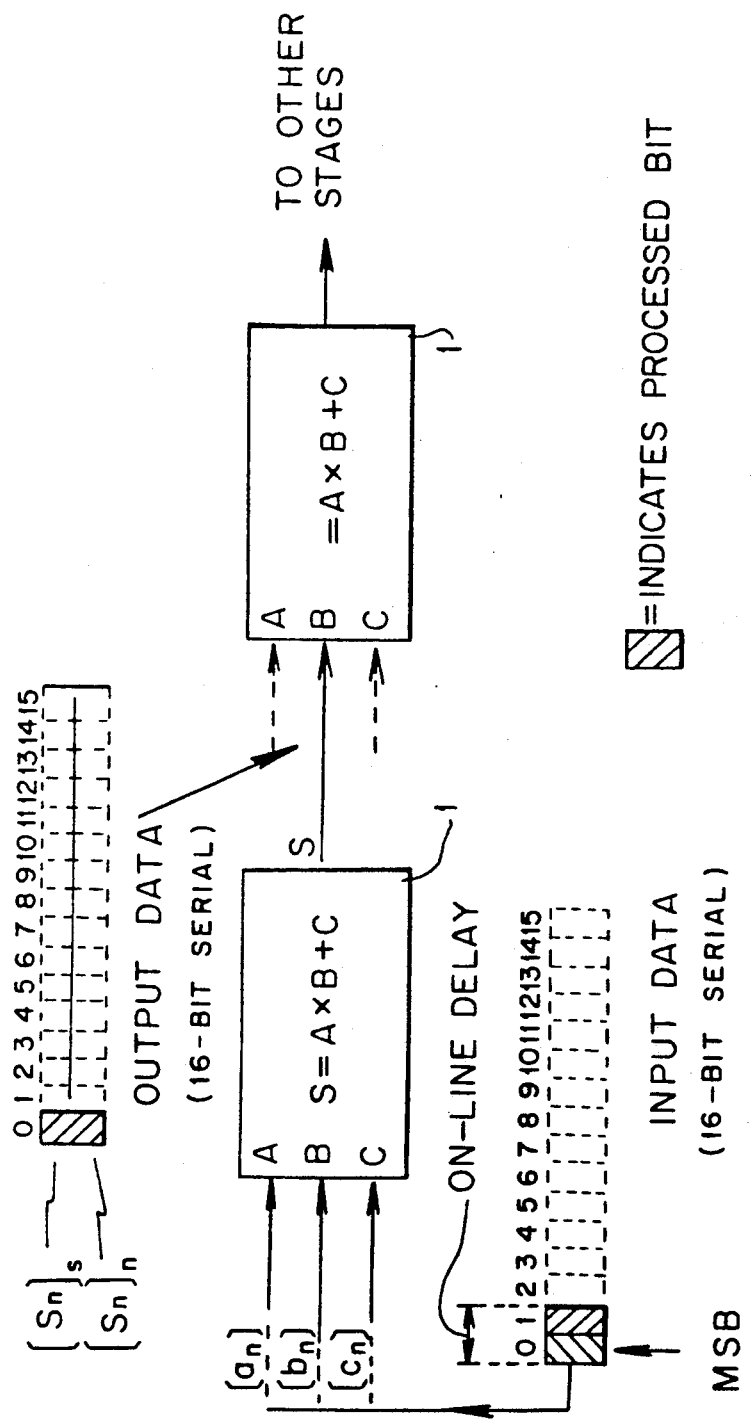
FIG. 1 is a schematic illustration of the on-line data flow into an arithmetic processing unit of the present invention and out thereof into a subsequent arithmetic processing unit of another stage.

Referring to FIG. 1, the arithmetic processing unit 1 of the present invention is shown, and the on-line data flow into and out of the arithmetic processing unit 1 is schematically illustrated. As illustrated, each operand A, B and C is expressed as a sequence of digits represented, for example, by $(a_0, a_1, \ldots a_n \ldots, a_{N-1})$, $(b_0, b_1, \ldots b_n, \ldots b_{N-1})$ and $(c_0, c_1, \ldots c_n, \ldots, c_{N-1})$, respectively, with the most significant digit $a_0$, $b_0$ and $c_0$ of each operand entering the arithmetic processing unit 1 first. Such mode of data flow into the arithmetic processing unit is known as "on-line", and while such a data flow can reduce processing time in demanding real-time applications, it is not necessarily limited thereto. In the preferred embodiment, the word length of the operands A, B and C is equal to the integer $N=16$, for a 16-digit word-length representation. Thus, in the preferred embodiment, each of the on-line operands A, B and C, is represented as a 16-digit word in on-line serial format, and at any n-th instant of time (i.e. at n-th computational cycle within the arithmetic processing unit), only one digit from each operand need be available, so long as the most significant digit of each is provided first, the second most significant digit provided second, and so on.

In the method and apparatus of the present invention, there are no constraints placed on the data format of the on-line operands A, B and C, other than that they take on binary values. As will be described in greater detail hereinafter, all internal arithmetic operations with the processor 1, are performed on operands and intermediate number strings, which are represented using a redundant binary number system (i.e., a format) which allows a number to have multiple representations. On the other hand, the output S of each arithmetic processing unit 1 hereof is always expressed in the redundant binary number format chosen.

While one of a variety of redundant binary number formats may be selected for use in carrying out the present invention, the "radix-2 signed digit" format is used in the preferred embodiment hereof. In the "radix- 2 signed digit" system of a redundant number representation, each signed digit, −1, 0, −1, requires two bits for representation of the "sign" and "magnitude" of the binary numbers. Thus, in such a system of redundant number representation, each "digit" of each of the operands A, B and C, has a "sign bit" and a "magnitude bit". In the preferred embodiment, then, each digit $a_n$, $b_n$ and $c_n$ of the on-line operands can take on the values 0, +1 and −1. As a result, using the signed digit number system, each 16-bit operand sequence requires two 16-bit sequences, one sequence expressing the sign value of each digit, and the other sequence expressing the magnitude value of each corresponding digit in the on-line operands. These sequences will be referred to as the sign sequence and magnitude sequence denoted, for example, by $\{a_n\}_s$ and $\{a_n\}_m$, respectively, for the on-line operand A. Notably, in each sign sequence, each bit value will represent the plus or minus sign of the corresponding binary digit in the magnitude sequence, whereas the value of each bit in the magnitude sequence simply represents the magnitude of the digit.

With the signed digit binary number system employed in the present invention, it will be clear then, that the data flow of operand digits $a_n$, $b_n$ and $c_n$ through the arithmetic processing unit 1 hereof, typically involves bit-processing of both the sign and magnitude sequences $\{a_n\}_s$, $\{a_n\}_m$; $\{b_n\}_s$, $\{b_n\}_m$; and $\{c_n\}_s$, $\{c_n\}_m$ for the on-line operands A, B and C, respectively. Thus, while illustrated only partly in the drawings, any realization of the method and apparatus hereof using the signed-digit system of redundant number representation, will involve the use of a parallel architecture for representing and processing the sign and magnitude bit values of the on-line operands, in a manner which will be apparent to those with ordinary skill in the art.

Figure 2:
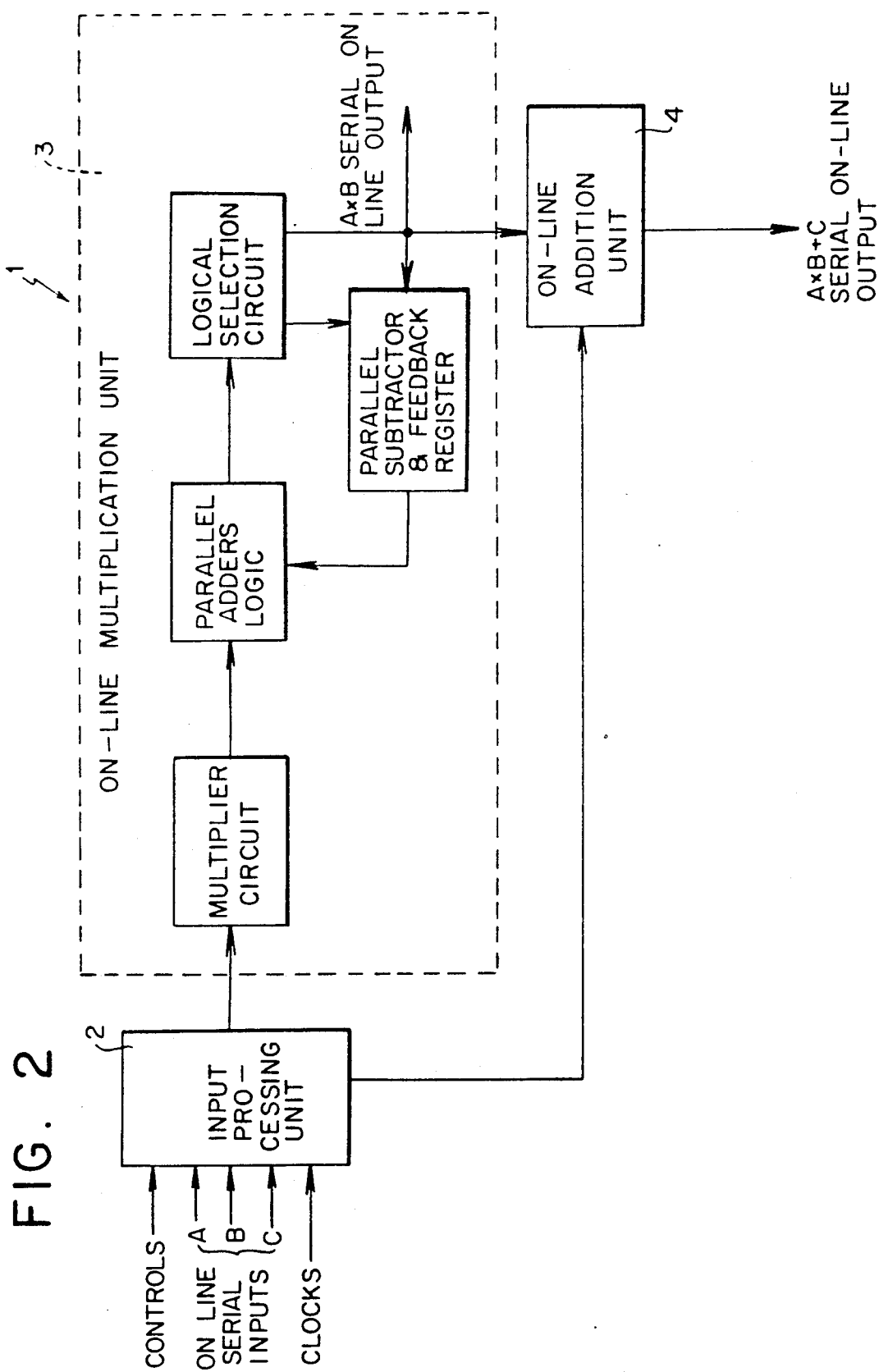
FIG. 2 is a high level functional block diagram of the arithmetic processing unit of the present invention, showing the input processing unit, on-line multiplication unit, and on-line addition unit thereof.

Referring now to FIG. 2, there is shown a high level functional block diagram of the arithmetic processor 1 of the present invention. In general, the arithmetic processor 1 comprises an input processing unit 2, a conventional on-line multiplication unit 3, and an on-line serial addition unit 4. As configured, two outputs of the input processing unit 2 are connected to the inputs of the on-line multiplication unit 3, and another output of the input processing unit 2 is connected to one input of the on-line addition unit 4. Also, the output of the on-line multiplication unit 3 is connected to the other input of the on-line serial addition unit 4. In order to produce a serial on-line output of the expression $S=(A\times B)+C$, on-line serial inputs of operands A, B and C are provided to the input processing unit 2, together with clock and control signals. In order to avoid confusion, the control and clock signals have been omitted from the drawings, as these are all within the conventional knowledge of those skilled in the art.

In general, the input processing unit 2 functions as a selective conversion means, which selectively converts the digits of on-line operands A, B and C sequentially entering the arithmetic processor 1, so that each digit is represented in a redundant binary number format. Also, the on-line data of the operands is conditioned so that word length growth within the arithmetic processor hereof is restrained to an N bit word length. Then, using the conventional on-line multiplication unit 3, the sequence of digits of operands A and B (available at the n-th computational cycle) are multiplied so as to produce the n-th product digit $p_n$ of the product $P=A\times B$, with the most significant digit $p_o$ being computed first. Then, using the on-line serial addition unit 4 of the present invention, the n-th product digit is added to the n-th digit of operand C, i.e. $c_n$, so as to produce (at the n-th computational cycle), the n-th digit, $s_n$, of the arithmetic expression $S=(A\times B)+C$. Notably, the most significant digit $S_o$ will be produced first.

Figure 3A:
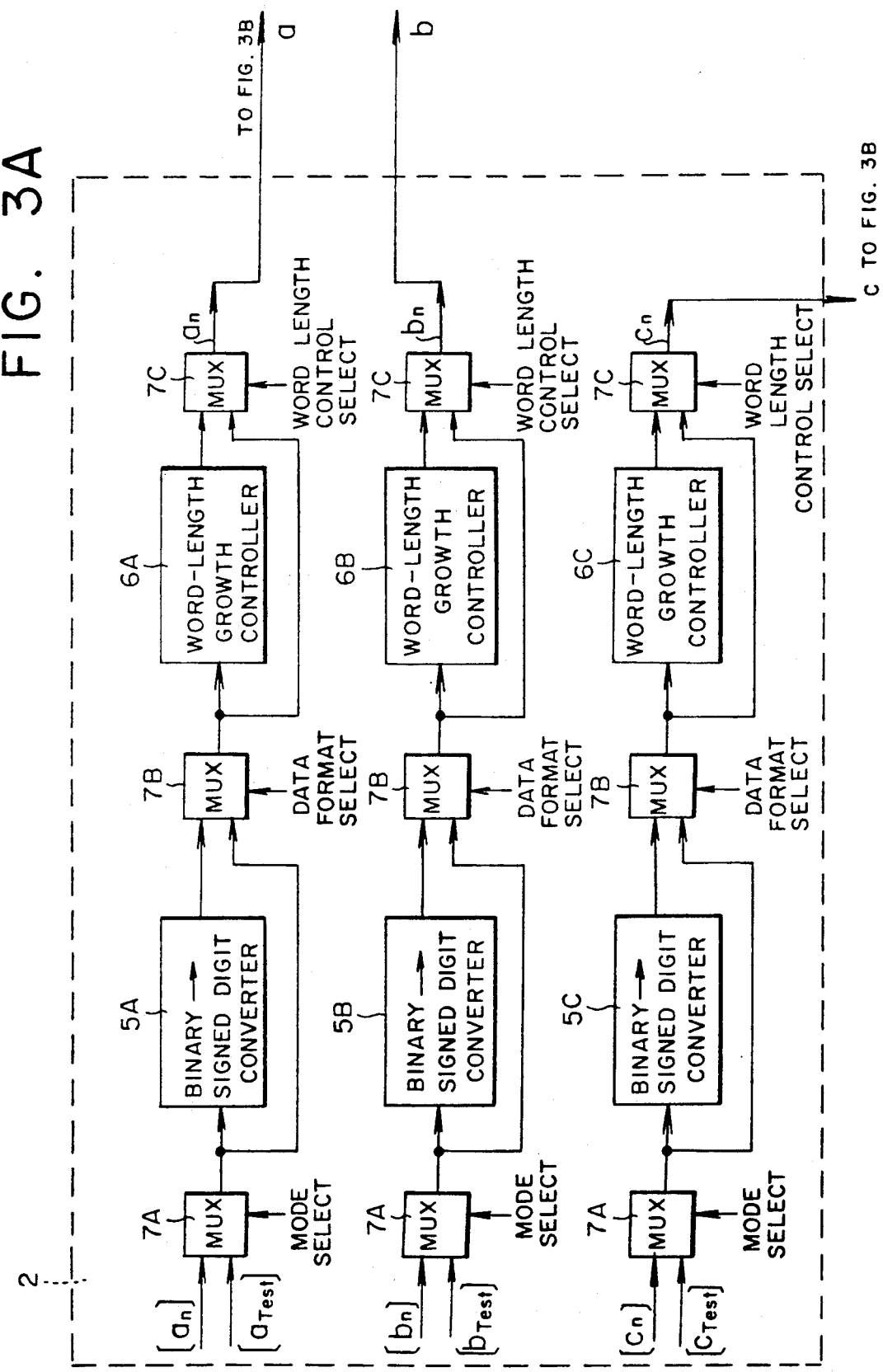
FIG. 3 is a lower level functional block diagram of the arithmetic processing unit illustrated in FIG. 2, further illustrating the bit-processing operations occurring within the major components of the arithmetic processing unit.
Figure 3B:
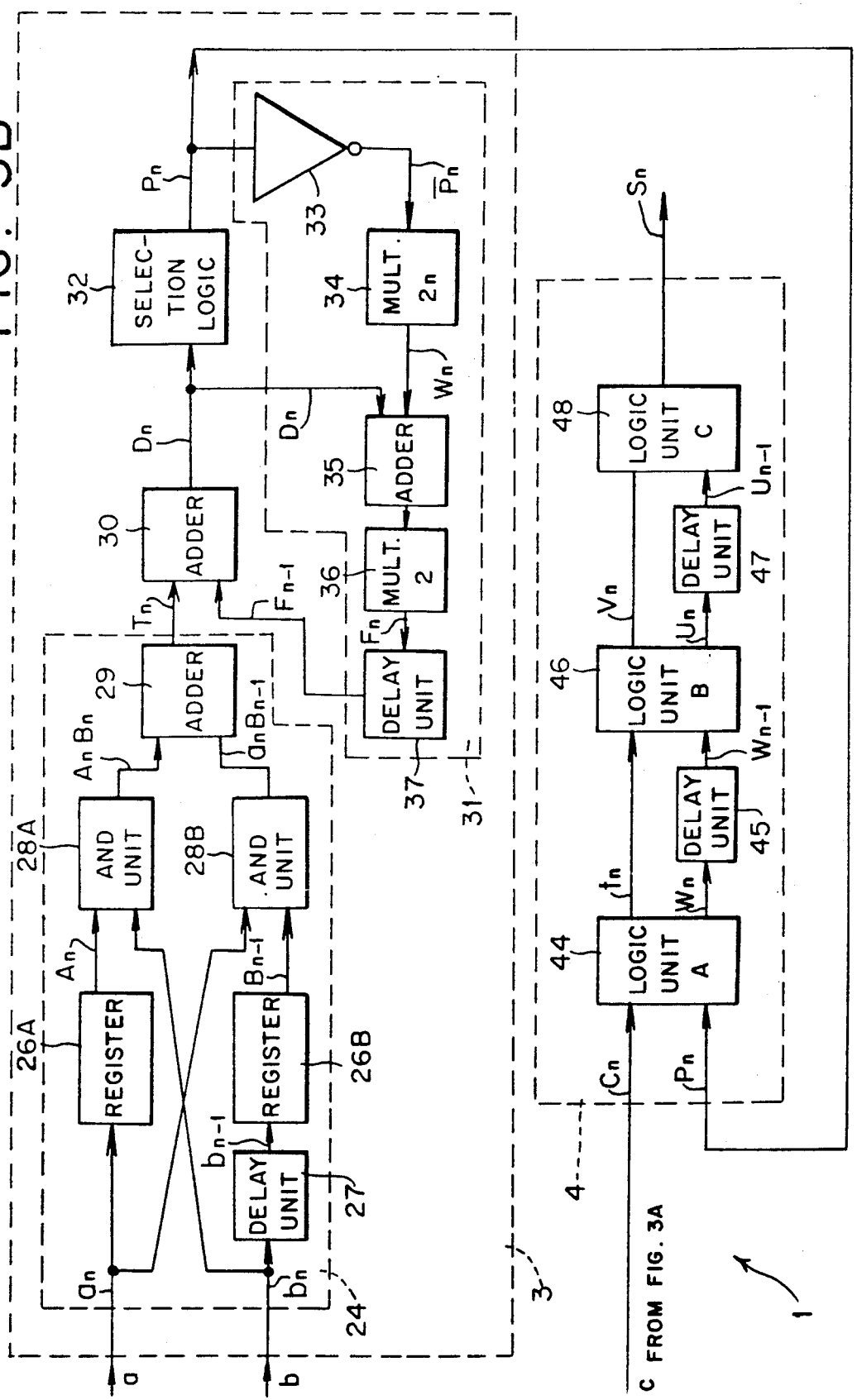

As illustrated in FIG. 3, the input processing unit 2 of the preferred embodiment hereof includes two subunits for each operand digit stream, namely: a binary-to-signed digit converter 5 whose output is connected to the input of a wordlength growth controller 6, by way of user-selectable switching device 7B. As used in FIG. 3, the binary-to-signed digit converter which corresponds to operand A is denoted by 5A, the converter which corresponds to operand B is designated by 5B, and the converter corresponding to operand C is designated by 5C. A similar designation is used for wordlength growth controllers 6A, 6B and 6C for operands A, B and C, respectively.

The input processing unit 2 also includes switching device before each binary-to-signed digit converter 5, in order to selectively engage or by-pass the binary-to-signed digit converters 5A, 5B and 5C depending on the data format of on-line operands provided to the arithmetic processor 1 hereof. User-selectable switching devices 7B are provided after each word-length growth control subunit for selectively engaging or by-passing the operation of such subunits 6A, 6B ad 6C. Also, a user-selectable switching device 7A is provided before each binary to signed digit converter 5 in order to selectively pass either on line operand data $a_n$, $b_n$ and $c_n$, or "test data patterns" to the input processing unit 2 depending on the "mode select" control signals provided to the switching devices 7A. As will be described herein after in an alternative embodiment shown in FIG. 8, "test data patterns" can be provided to the input processing unit 2 through switching devices 7A, for purposes of testing the arithmetic (i.e. computational) performance of the apparatus hereof.

In order to selectively engage the service of the binary-to-signed digit converters 5A through 5C, when the on-line operand data format is "regular binary", a "data format select" control signal is provided to switching devices 7B so as to pass only "converted" operand data to the word-length growth controllers 6A through 6C, and user-selectable switching devices 7C. If a word-length growth control is desired, then a "word-length growth select" control signal is provided to the switching devices 7C so as to pass only the operand data processed by the word-length growth controllers 6A through 6C. As will be described in greater detail hereinafter, the purpose of each word-length control subunit is to detect the presence of certain data patterns along respective operand bit streams, and to convert these data patterns into equivalent data patterns in order to prevent the occurrence of operand (and intermediate) word-length growth within the on-line multiplication subunit and on-line serial addition unit 4 hereof. Notably, each of the switching devices 7A, 7B and 7C described above, can be realized using a conventional multiplexer implemented in a manner well known in the art.

Referring to FIG. 3, operand digits $a_n$ and $b_n$ after having been processed by the input processing unit 2, are then provided to the conventional on-line multiplication unit 3, in the sign bit and magnitude bit data format. The output $p_n$ at the n-th computational cycle, is provided from the on-line multiplication unit 3, to the on-line serial addition unit 4, along with on-line operand bit $c_n$. Two computational cycles (i.e. digit intervals) later, the output $s_n$ is generated in signed digit (i.e. sign-magnitude) format. Notably, $s_n$ represents the n-th digit of the arithmetic expression $S=(A\times B)-C$, and the most significant digit $s_0$ (i.e. $s_n=0$) is produced first.

Figure 4:
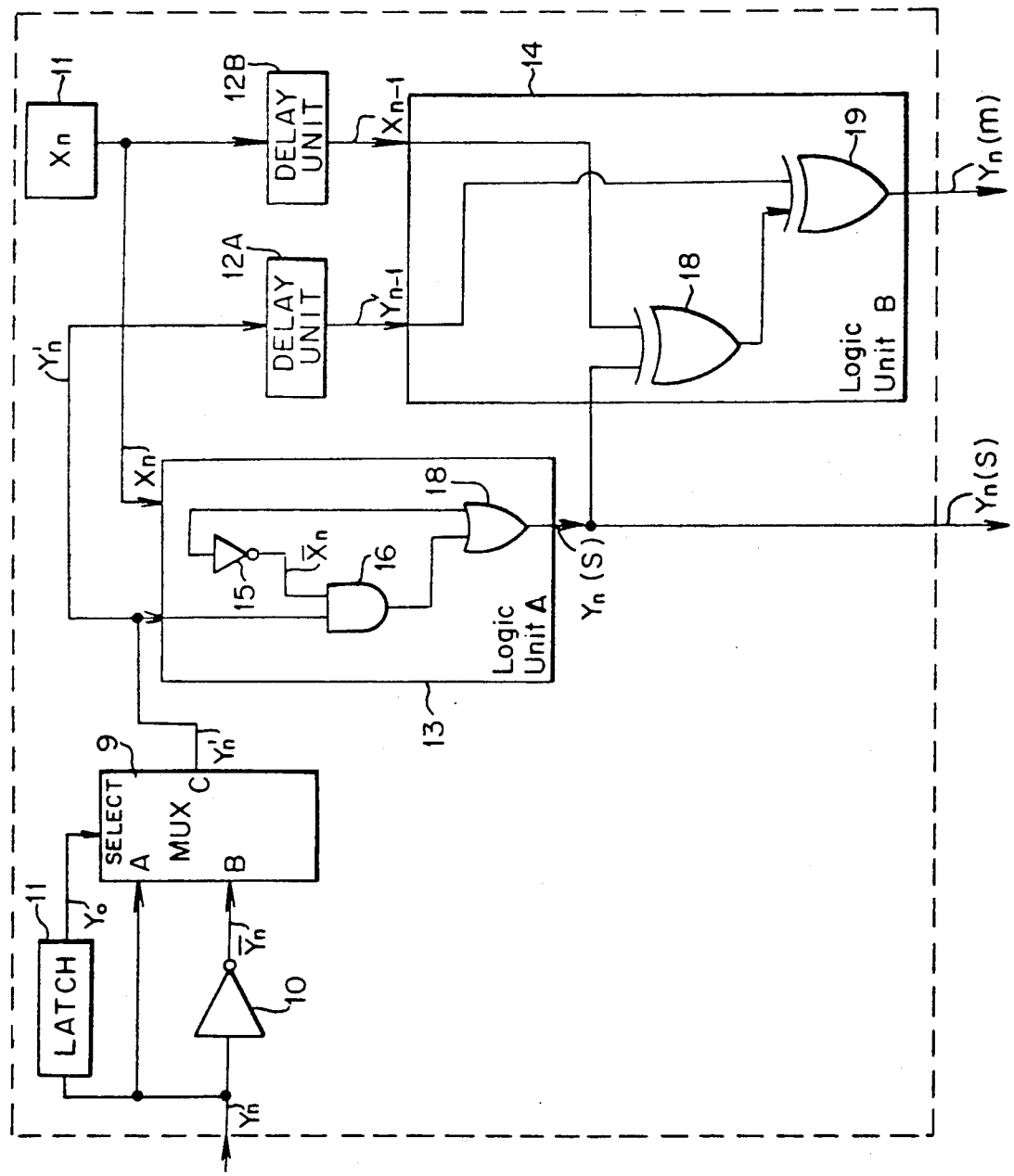
FIG. 4 is a functional block diagram illustrating the logical bit-processing operation carried out in the binary to signed-digit conversion subunit of the input processing unit shown in FIGS. 2 and 3.

Referring now to FIG. 4, the operation and structure of the binary-to-signed digit converter for each operand A, B and C, will now be described in detail. Since the structure and function of each binary-to-signed digit converter 5 hereof is identical for each operand, a description thereof will be made with respect to binary-to-signed digit converter 5A.

If each digit of operands A, B and C sequentially entering the arithmetic processor is expressed in the regular binary data format (i.e. each digit is represented by a single binary bit 1 or 0), then these streams of digits $\{a_n\}$, $\{b_n\}$ and $\{c_n\}$ are provided to the respective binary-to-signed digit converter using user-selectable switching devices 7B. For purposes of illustration, the operation of the binary-to-signed digit converter is best explained in terms of the logical operations which occur to "binary" input digits $a_n$, $b_n$ and $c_n$ for $n=0, 1, 2 \ldots N=16$. For purposes of illustration only, $y_n$ as used hereinbelow shall be deemed to represent $a_n$, $b_n$ and $c_n$ digits in the sense of processing which they undergo in the data format conversion.

The data format conversion from binary-to-signed digit (i.e. sign-magnitude) form involves essentially a two-stage process in which $y_n$ (the n-th binary bit of an on-line operand) is converted into a sign-magnitude binary number having a sign bit or component $y_n(s)$ and a magnitude bit or component $y_n(m)$, which represents the sign and magnitude of the output digit, respectively.

During the first stage of the data conversion process, bits $y'_n$ and $x_n$ are provided. While $x_n$ is an internally stored number immediately available for input to the second stage, bit $y'_n$ is produced from the n-th binary digit $y_n$ as follows. The first stage of the binary-to-signed digit converter 5A, employs a multiplexer 9, an inverter 10, and a latch 11. As shown in FIG. 4, the input of the inverter 10 is connected to the input of latch 11 as well to input A of the multiplexer 9. Also, the output of the inverter 10 is connected to input B of the multiplexer 9, whereas the output of the latch 11 is connected to the "select" input of the multiplexer 9. In this circuit, the input digit to the multiplexer 9 is $y_n$ and the complement thereof $\bar{y}_n$ is produced by the inverter 10. The "select" input of the multiplexer 9 is the 0-th binary digit $y_0$ provided through the latch 11. Using this stage of logical processing, the output of the multiplexer is $y'_n = y_n$ when $y_0 = 0$, and $y'_n = \bar{y}_n$ when $y_0 = 1$.

During the second stage of logical processing, the $y'_n$ digit and the internally stored digit $x_n$ are subject to logical operations to provide the sign and magnitude bits, $y_n(s)$ and $y_n(m)$, respectively, for the n-th input digit $y_n$. The second stage of the binary-to-signed-digit converter 5A, employs a register 11 for storing bit $x_n$; delay units 12A and 12B for delaying intermediate bits $y'_n$ and $x_{n-1}$, respectively; logic unit 13 which receives bits $y'_n$ and $x_n$ as input to produce as output, sign bit $y_n(s)$; and logic unit 14 which receives bits $y'_{n-1}$, $x_{n-1}$ and $y_n(s)$ as input, to produce as output, magnitude bit $y_n(m)$. Logic unit 13 is uniquely specified by the Boolean expression $x_n + \bar{x}_n y'_n$, and thus can be realized by the logic circuit 13 formed by inverter 15, AND gate 16 and OR gate 17 configured according to this simple Boolean expression. On the other hand, logic unit 14 is uniquely specified by the Boolean expression $y_n(m-)=y_n(s) \oplus x_{n-1} \oplus y'_{n-1}$ and thus can be realized by the logic circuit 14 formed by EXCLUSIVE-OR gates 18 and 19 configured according to this Boolean expression. Internally provided bit $x_n = 0$ for $n = 0$ to $N-1$, whereas $x_n = 1$ for $n = N$. Intermediate digit $y'_n$ on the other hand is provided as described hereinbefore. The sign bit $y_n(s)$ for the n-th output digit is given by the Boolean expression $x_n + \bar{x}_n \cdot y'_n$, while the magnitude bit $y_n(m)$ of the n-th input bit is given by the Boolean expression $y_n(m) \oplus x_{n-1} \oplus y'_{n-1}$. Notably, in the Boolean expressions given hereinabove and hereinafter, the "·" represents the Boolean "AND" operation; "+" represents the Boolean "OR" operation; "$\oplus$" represents the Boolean "EXCLUSIVE OR" operation; and "−" represents the "Complement" operation.

For the n-th operand digit $y_n$, each pair of sign and magnitude bits (i.e. $y_n(s)$ and $y_n(m)$) is then provided from the binary-to-signed-digit converter 5, to the respective word-length growth control subunit 6 for bit-serial processing in a manner to be described hereinbelow.

In general, "signed digits" based operations cause unnecessary word length growth due to adjacent 1 and $\bar{1}$ (i.e. $-1$), or $\bar{1}$ and 1 digits. These combinations of (or conditions on) adjacent digits are undesirable since they may cause overflow (i.e. excessive word length growth) and provide no useful information to number representation. In the preferred embodiment, the manner in which an operand (or other intermediate word) representation is reduced to the minimum of digits, is by eliminating the above-specified digit conditions. Thus, each word-length control subunit detects the presence of data patterns (1 $\bar{1}$) and ($\bar{1}$ 1) in the sign and magnitude bit sequences $\{a_n\}_s \{a_n\}_m$, $\{b_n\}_s \{b_n\}_m$, $\{c_n\}_s \{c_n\}_m$, and converts these data patterns to equivalent data patterns. In particular, subunit 6A, 6B and 6C each transforms adjacent "1 $\bar{1}$" bit combinations to "0 1" bit combinations, and "$\bar{1}$ 1" bit combinations to "0 $\bar{1}$" bit combinations. In this manner, the operands as well as other intermediary numbers (in the on-line multiplication and serial addition units), do not grow beyond a predetermined word-length, e.g. integer N. To achieve such conditioning of correctly formatted bit sequences of operands A, B and C, each signed digit of each operand (requiring two bits for representation of sign and magnitude) are subject to the following logical processing operation described below.

Figure 5:
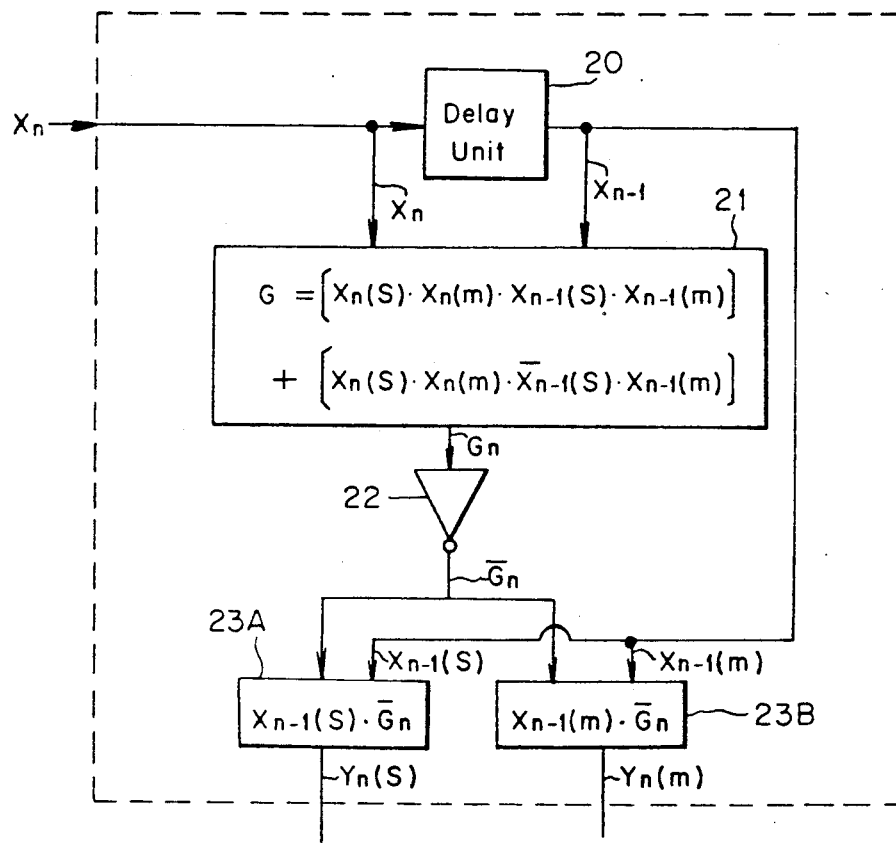
FIG. 5 is a functional block diagram illustrating the logical bit-processing operations carried out in the wordlength maintenance subunit of the arithmetic processing unit shown in FIGS. 2 and 3.

For purposes of illustration only, each signed-digit, whether of operand A, B or C, to be provided to the respective word-length control subunit, is designated as $x_n$, and output thereof is designated as $y_n$ as illustrated in FIG. 5. Each word-length control unit hereof comprises a delay unit 20 into which signed digit $x_n$ is provided as input and from which delayed signed-digit $x_{n-1}$ is output. Each word-length control unit also comprises logic units 21, 23A and 23B, and inverter 22. As illustrated in FIG. 5, $X_n$ and $x_{n-1}$ are provided as input into logic unit 21 which computes intermediate bit $G_n$ in accordance with the Boolean expression:

$$G_n = [\overline{X_n}(s) \cdot x_n(m) \cdot x_{n-1}(s) \cdot x_{n-1}(m)] + [x_n(s) \cdot x_n(m) \cdot x_{n-1}(s) \cdot \overline{x}_{n-1}(m)]$$

where "·", "+", "$\oplus$" and "−" represent Boolean operations previously defined hereinabove. The intermediate bit $G_n$ from logic unit 21 is then provided to the input of converter 22 to produce $\overline{G}_n$. The output of the inverter 22 is provided as input to both logic units 23A and 23B. However, only the sign bit $x_{n-1}(s)$ of delayed signed-digit $x_{n-1}$ is provided as input to logic unit 23A, whereas only the magnitude bit $x_{n-1}(m)$ of delayed signed-digit $x_{n-1}$ is provided as input to logic unit 23 B. On the basis of input bits $G_n$ and $x_{n-1}(s)$, logic unit 23A computes the "conditioned" sign bit $y_n(s)$ in accordance with the Boolean expression:

$$y_n(s) = x_{n-1}(s)\overline{G_n}$$

In a similar manner, but on the basis of input bits $\overline{G}_n$ and $x_{n-1}(m)$, logic unit 23B computes the "conditioned" magnitude bit $y_n(m)$ in accordance with the Boolean expression:

$$y_n(m) = x_{n-1}(m)\cdot\overline{G_n}$$

The operation of the word-length growth controller hereof, will now be described.

Into each above-described word-length control subunit 6A, 6B and 6C, both sign and magnitude bits of respective operands are provided, and output therefrom are "conditioned" sign and magnitude bits. To achieve the necessary transformation of the data patterns to avoid word length growth beyond N, the following logic functions are carried out by each word-length control subunit hereof. For input digit $x_n = 0$ (i.e. $x_n(s) = 0$, $x_n(m) = 0$), then output digit $y_n = x_{n-1}$. For input digit $x_n = +1$ (i.e. $x_n(s) = 0$, $x_n(m) = 1$), then output digit $y_n = 0$ if $x_{n-1} = 0$, and $y_n = 1$ otherwise. Also, for the case where input digit $x_n = -1$ (i.e. $x_n(s) = 1$, $x_n(m) = 1$), then output digit $y_n = -1$. For example, upon detecting the number:

$$(-1903)_{10} = (\overline{1}\,1\,0\,0\,\overline{1}\,\overline{1}\,0\,\overline{1}\,\overline{1}\,0\,0\,\overline{1}\,\overline{1}L\,)_{SD}.$$

the sign and magnitude bits of each digit in this number will be processed by the word length growth control subunit to produce the "equivalent" sign digit number $$(\overline{1}\,0\,0\,0\,1\,0\,0\,1\,0\,0\,0\,1)_{SD} = (-1903)_{10}.$$

Thus, by performing these logic operations on the bit sequences of on-line operands A, B and C, unrestricted word-length growth within the arithmetic processing unit 1 hereof is effectively controlled. From each of the above logic functions, a truth table can be formed, and from each truth table, Boolean expressions and digital logic circuitry can be implemented in a straightforward manner well known in the art.

Figure 6:
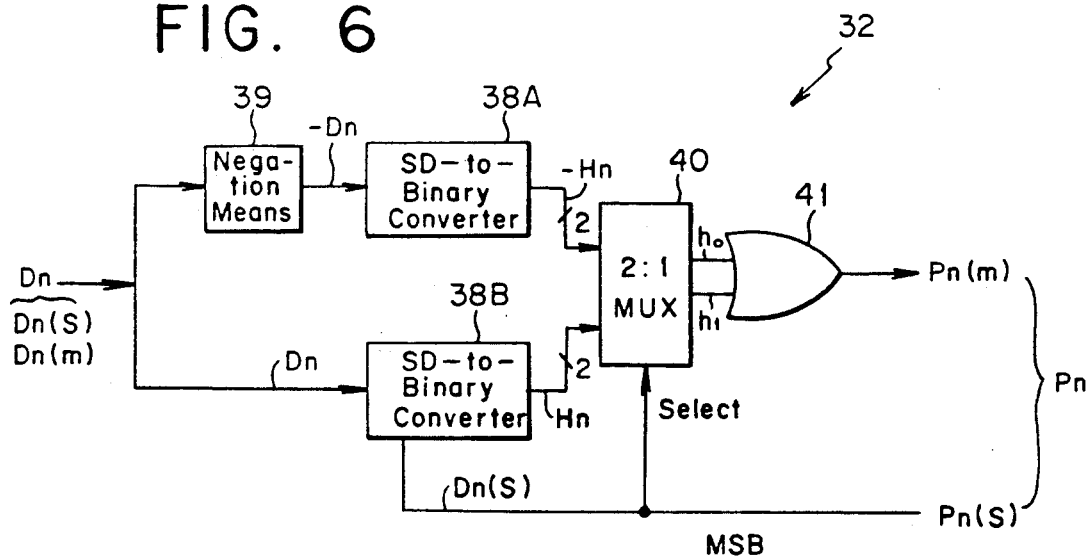
FIG. 6 is a functional block diagram illustrating the logical bit-processing operations carried out in the selection logic of the arithmetic processing unit shown in FIGS. 2 and 3.

Referring now to FIGS. 3 and 6, the structure and function of the conventional on-line multiplication unit 3 will now be described as follows.

In general, the purpose of the on-line multiplication unit 3 hereof is to multiply two on-line operands A and B and produce product P. However, at each cycle (i.e. digit interval) only the n-th to the 0-th bits of operands A and B are available and thus only one digit of the product, $p_n$, is produced during that particular cycle. Thus, to perform such on-line multiplication, the multiplicand sequence $\{a_n\}$ must be multiplied by the multiplier sequence $\{b_n\}$ in an on-line manner. Notably, by definition, the multiplicand sequence $\{a_n\}$ equals $\{a_0, a_1, \ldots, a_n, \ldots a_{N-1}\}$, and the multiplicand sequence $\{b_n\}$ equals $\{b_0, b_1, \ldots, b_n, \ldots b_{N-1}\}$.

To achieve on-line multiplication, several stages of logic processing are involved. During the first stage, each nth available bit of operands A and B, (i.e. $a_n$ and $b_n$), is provided to a conventional multiplier circuit 24. This multiplier circuit 24 comprises a pair of N-digit concatenation registers 26A and 26B, a delay unit 27, AND logic units 28A and 28B and a N-digit parallel adder 29. Delay unit 27 of 1 digit length is connected to the input of register 26B. The input of register 25A is connected to one input of AND logic unit 28B, whereas, the input of delay unit 27 is connected to one input of AND logic unit 28A. The output of register 25A is connected to the other input of AND logic unit 28A, whereas the output of register 26B is connected to the other input of AND logic unit 28B. The outputs of AND logic units 28A and 28B are connected to the two inputs of parallel adder 29. In response to each nth available bit of operands A and B (i.e., $a_n$ and $b_n$). The binary output of parallel adder 29 is expressed algebraically in signed digit form by:

$$T_n = A_n \cdot b_n + a_n \times B_{n-1} \quad (1)$$

where n equals the "digit index", which ranges from 0 to 16 for N=16; $A_n$ is referred to as the concatenated multiplicand having a word-length which is a function of the digit index n, that is, at the n-th digit interval $A_n = \{a_0 a_1 a_2 \ldots a_n\}$; and $B_n$ is referred to as the concatenated multiplier having a word-length which is a function of the digit index n, that is, at the n-th digit interval, $B_n = \{b_0 b_1 b_2 \ldots b_n\}$. Notably, in expression (1) above, "×" represents the operation of multiplication and "+" represents the operation of addition.

The operation defined by expression (1) above assures that for each input digit of operands A and B, the current input digit is "concatenated" to the previous input digits in registers 26A and 26B for the concatenated multiplicand $A_n$ and concantenated multiplier $B_n$, respectively. The content of each register 26A and 26B is then cross-multiplied by the present digit of the other input operand using "AND" logic units 28A and 28B. Since each individual digit must be chosen from the set $\{-1, 0, 1\}$, the product is generated as follows: (i) by simply complementing the sign bit for all digits in the concantenation registers 26A and 26B, to perform multiplication by $-1$; (ii) by setting sign and magnitude bits to zero, to perform multiplication by 0; or (iii) simply leaving the contents of the registers 26A and 26B unchanged, to perform multiplication by $+1$.

At the second stage of the on-line multiplication process, the on-line multiplication unit 3 performs in a N-digit parallel adder 30, the operation of parallel addition on two signed digit numbers, $T_n$, the augend, and the addend, $F_n$, to produce a number $D_n$ in accordance with the expressions:

$$D_n = T_n + F_n \quad (2)$$

where:

$$F_n = 2 \times (D_n - W_n) \quad (3)$$

and $$W_n = -p_n \times 2^N \quad (4)$$

where N is the word length of the multiplicand and multiplier sequences and "×" and "+" represent the operations of multiplication and addition, respectively. As illustrated in FIG. 3, the signed digit number $F_n$ is produced by a feedback logical operation in a feedback circuit 31, whereas $W_n$ is produced by a logical selection operation in a logical selection circuit 32.

In the preferred embodiment, the feedback circuit 31 of FIG. 3, comprises an inverter 33, a first multiplier 34, a parallel adder 35, a second multiplier 36, and a second delay unit 37 of digit length. These elements are configured in FIG. 3 as follows. The output of the selection logic circuit 32 is connected to the input of the inverter 33. The output of the inverter 33 is connected to the first multiplier 34, and the output of the first multiplier 34 is provided to one input of the parallel adder 35. The other input to the parallel adder 35 is provided from the output of parallel adder 30. The output of parallel adder 35 is connected to the input of second multiplier 36, and the output thereof $F_n$ is connected to the input of delay unit 37. In turn, the output of delay unit 37 and the output of parallel adder 29 are connected to the input of parallel adder 30. The output of parallel adder 30, on the other hand, is connected to the input of selection logic circuit 32, to complete the feedback loop.

As illustrated in FIG. 6, the selection logic circuit 32 of FIG. 3 comprises first and second signed-digit-to-binary converters 38A and 38B, negation means 39, multiplexer 40 and OR gate 41. The output word $D_n$ from the parallel adder 30, is provided to the input of signed-digit-to-binary converter 38B, as well as to the input of the negation means 39. The output of the negation means 39 is provided to converter 38A, and the outputs $-H_n$ and $H_n$ from signed-digit-to-binary converters are provided to the inputs of multiplexer 40, where the most significant sign bit $D_n(s)_{MSB}$ of word $D_n$, is used as "select data" provided to the control input of the multiplexer 40. The two outputs $h_0$ and $h_1$ of the multiplexer 40 are provided to the input of the OR gate 41. The output of the OR gate 4 provides the magnitude bit $p_n(m)$, whereas the most significant sign bit $D_n(s)_{MSB}$ provides the sign bit $p_n(s)$.

The operation of the logic selection circuit 32 and feedback circuit 31, will now be described as follows.

As illustrated in FIG. 6, in the logic selection circuit 32, the signed digit (i.e. sign magnitude) result $D_n$ is converted from signed digit representation to conventional binary format to produce a converted product $H_n$ and a converted inverse product $-H_n$. Such conversions are carried out using signed-digit-to-binary converters 38A and 38B and inverter 39 described above. The converted product $H_n$ and the converted inverse of the product $-H_n$ are then provided to multiplexer 40, which uses the sign bits of product $D_n$ as "select bits", and produces as output, binary bits $h_0$ and $h_1$. These bits $h_0$ and $h_1$ are provided to the "OR" gate 41, to produce a selected "magnitude bit" $p_n(m)$ for the product digit $p_n$. On the other hand, the "sign bit" for $p_n$ is simply provided by the "most significant" sign bit of $D_n$. This stage, in effect, performs a "rounding" operation on product word $D_n$ to determine the value of n-th digit of product $P_n$.

In order to produce the feedback addend $F_{n-1}$, the result $D_n$ specified by expression (2) and the product digit $p_n$ after being negated and multiplied as specified in expression (4), are then added together and multiplied by "2" to produce $F_n$. Then, $F_{n-1}$ is produced simply by delaying $F_n$ by one (1) digit interval. For further details of this conventional on-line multiplication process, reference should be made to the 1975 Phd Thesis of Milos Dragutin Ercegovac entitled "A General Method For Evaluation Of Functions And Computations In A Digital Computer", defended at University of Illinois at Urbanachampaign, Jul., 1975. This Phd thesis is available at the Library of the University of Illinois, on Microfilm No. 76-6758.

Referring now to FIGS. 3, 7A, 7B and 7C in particular, the structure and function of the on-line serial addition unit 4 of the present invention will now be described in detail below.

In the preferred embodiment, the one-line serial addition unit 4 of the present invention comprises three logic units 44, 46 and 48, and two delay units 45 and 47, each providing one (1) digit interval of delay. Logic unit 44 has two inputs for receiving digits $c_n$ and $p_n$, and two outputs. One output of logic unit 44 is connected to one input of logic unit 46 for providing digit $t_n$ to the input thereof, and the other output of logic unit 44 is connected to the input of delay unit 45 to provide digit $w_n$ thereto. The output of delay unit 45, in turn, is connected to the second input of logic unit 46 to provide delayed digit $w_{n-1}$ to the other input of logic unit 46. Logic unit 46 also has two outputs, one of which is connected to one input of logic unit 48 to provide digit $v_n$ thereto, and the other of which is connected to the input of delay unit 47 to provide digit $u_n$ to the input of delay unit 47. The output of delay unit 47, in turn, is connected to the second input of logic unit 48 to provide delayed digit $u_{n-1}$ to the other input of logic unit 48. The sole output of logic unit 48 provides the n-th digit of $S=(A \times B)+C$, i.e. $s_n$.

The structure and function of each logic unit 44, 46 and 48 can be uniquely described in terms of the logic function they each perform. Specifically, regarding logic unit 44, sign and magnitude bits $t_n(s)$ and $t_n(m)$ of digit $t_n$ are computed in terms of signed digits $c_n$ and $p_n$ according to the following Boolean expressions:

$$t_n(s) = [\overline{p}_n(m) \cdot c_n(m) \cdot c_n(s)] + [p_n(s) \cdot c_n(m) \cdot c_n(s)] + [p_n(s) \cdot p_n(m) \cdot \overline{c}_n(m)]$$

$$t_n(m) = [c_n(m) \cdot \overline{p}_n(m)] + [p_n(m) \cdot \overline{c}_n(m)] + [p_n(s) \cdot c_n(s) \cdot c_n(m)] + [\overline{p}_n(s) \cdot \overline{c}_n(s) \cdot c_n(m)]$$

Sign and magnitude bits $w_n(s)$ and $w_n(m)$ of signed-digit $w_n$ are computed in terms of signed-digits $c_n$ and $p_n$ according to the following Boolean expressions:

$$w_n(s) = [\overline{p}_n(s) \cdot p_n(m) \cdot c_n(s) \cdot \overline{c}_n(m)]$$

$$w_n(m) = [p_n(m) \cdot c_n(m)] + [p_n(m) \cdot \overline{c}_n(m)] = p_n(m) \oplus c_n(m)$$

Regarding logic unit 46, sign and magnitude bits $v_n(s)$ and $v_n(m)$ of signed-digit $v_n$, are computed in terms of signed digits $t_n$ and $w_{n-1}$ according to the following Boolean expressions:

$$v_n(s) = t_n(s) \cdot t_n(m) \cdot w_{n-1}(s) \cdot w_{n-1}(m)$$

$$v_n(m) = [\overline{t}_n(s) \cdot t_n(m) \cdot \overline{w}_{n-1}(s) \cdot \overline{w}_{n-1}(m)] + [t_n(s) \cdot t_n(m) \cdot w_{n-1}(s) \cdot w_{n-1}(m)]$$

Sign and magnitude bits $u_n(s)$ and $u_n(m)$ of signed-digit $u_n$, are computed in terms of signed digits $t_n$ and $w_{n-1}$ according to the following Boolean expressions:

$$U_n(s) = [\overline{t}_n(m) \cdot w-1(s) \cdot w_n-1(m)] + [t_n(s) \cdot t_n(m) \cdot w_n-1(-m)]$$

$$u_n(m) = t_n(m) \oplus w_{n-1}(m)$$

Regarding logic unit 48, sign and magnitude bits $s_n(s)$ and $s_n(m)$ of signed-digit $s_n$, are computed in terms of signed digits $v_n$ and $u_{n-1}$ according to the following Boolean expressions:

$$s_n(s) = [\overline{v_n}(m) \cdot u_{n-1} \cdot u_{n-1}(m)]$$
$$] + [v_n(s) \cdot v_n(m) \cdot \overline{u}_{n-1}(m)]$$

$$s_n(m) = v_n(m) \oplus u_{n-1}(m)$$

Using the three sets of Boolean expressions posited hereinabove as unique specifications for the logic units 44, 46 and 48 hereof, three digital logic circuits 44', 46' and 48' illustrated in FIGS. 7A, 7B and 7C respectively, have been constructed.

Figure 7A:
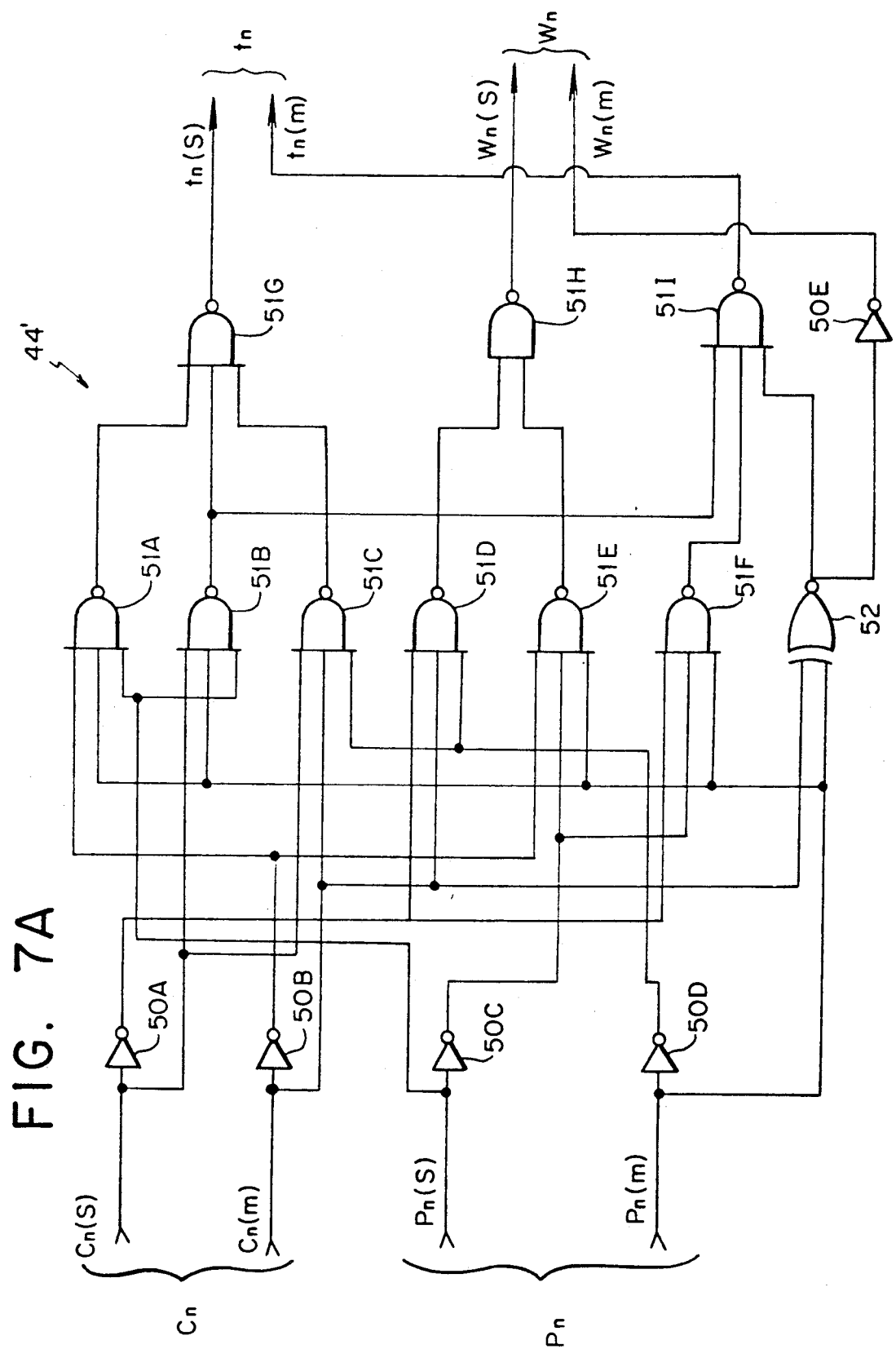

As shown in FIG. 7A, digital logic circuit 44' comprises five inverters 50A through 50E, nine NAND gates 51A through 51I, and one EXCLUSIVE-NOR gate 52. The input of inverter 50A is connected to one input of NAND gate 51D and one input of NAND gate 51C. The output of inverter 50A is connected to one input of NAND gate 51D and one input of NAND gate 51F. The input of inverter 50B is connected to one input of NAND gate 51C, to one input of NAND gate 51D, and to one input of EXCLUSIVE-NOR gate 52. The input of inverter 50C is connected to one input of NAND gate 51A and one input of NAND gate 51B, whereas the output of inverter 50C is connected to one input of NAND gate 51E and to one input of NAND gate 51F. The input of inverter 50D is connected to one input of NAND gate 51A, to one input of NAND gate 51B, to one input of NAND gate 51E, to one input of NAND gate 51F and to one input of EXCLUSIVE-NOR gate 52. The output of NAND gate 51A is connected to an input of NAND gate 51G, and the output of NAND gate 51B is connected to another input of NAND gate 51G, and to one input of NAND gate 51I. The output of NAND gate 51C is connected to another input of NAND gate 51G, whereas the output of NAND gates 51D and 51E are provided to the inputs of NAND gate 51H. The output of NAND gate 51F is connected to an input of NAND gate 51I, whereas the output of the EXCLUSIVE-NOR gate 52 is connected to one input of NAND gate 51I and to the input of inverter 50E. The sign and magnitude bits of operand digit $c_n$ are provided to the inputs of inverters 50A and 50B respectively, while the sign and magnitude bits of product digit $p_n$ are provided to the inputs of inverters 50C and 50D, respectively. The outputs of NAND gate 51G and inverter 50E provide the sign and magnitude bits of digit $t_n$ respectively, while the outputs of NAND gates 51H and 51I provide the sign and magnitude bits of digit $w_n$, respectively.

As shown in FIG. 7B, digital logic circuit 46' comprises five inverters 53A through 53E, and nine NAND gates 54A through 54I. The input of inverter 53A is connected to an input of NAND gate 54A and to an input of NAND gate 54D, whereas the output of NAND gate 53A is connected to an input of NAND gate 54B. The input of NAND gate 53B is connected to an input of NAND gate 54A, to an input of NAND gate 54B, to an input of NAND gate 54D, and to an input of NAND gate 54F. The output of inverter 53B is connected to an input of NAND gate 54C and to an input of NAND gate 54E. The input of inverter 53C is connected to an input of NAND gate 54A and to an input of NAND gate 54C, whereas the output of inverter 53C is connected to an input of NAND gate 54B. The input of inverter 53D is connected to an input of NAND gate 54A, to an input of NAND gate 54B, to an input of NAND gate 54C, and to an input of NAND gate 54E. The output of inverter 53D is connected to an input of NAND gate 54D and to an input of NAND gate 54F. The output of NAND gate 54A is connected to an input of inverter 53E and to an input of NAND gate 54G, whereas the output of NAND gate 54B is connected to an input of NAND gate 54G. The outputs of NAND gates 54C and 54D are connected to the inputs of NAND gate 54H. Finally, the outputs of NAND gates 54E and 54F are connected to the inputs of NAND gate 54I to complete the interconnection of the logic elements of logic circuit 46'. As illustrated in FIG. 7B, the sign and magnitude bits of digit $t_n$ are provided to the inputs of inverters 53A and 53B, respectively, while the sign and magnitude bits of delayed digit $w_{n-1}$ are provided to the inputs of inverters 53C and 53D, respectively. Also, the sign and magnitude bits of digit $v_n$ are provided by the outputs of inverter 53E and NAND gate 54G, respectively, while the sign and magnitude bits of digit $u_n$ are provided by the outputs of NAND gates 54H and 54I, respectively.

Figure 7C:
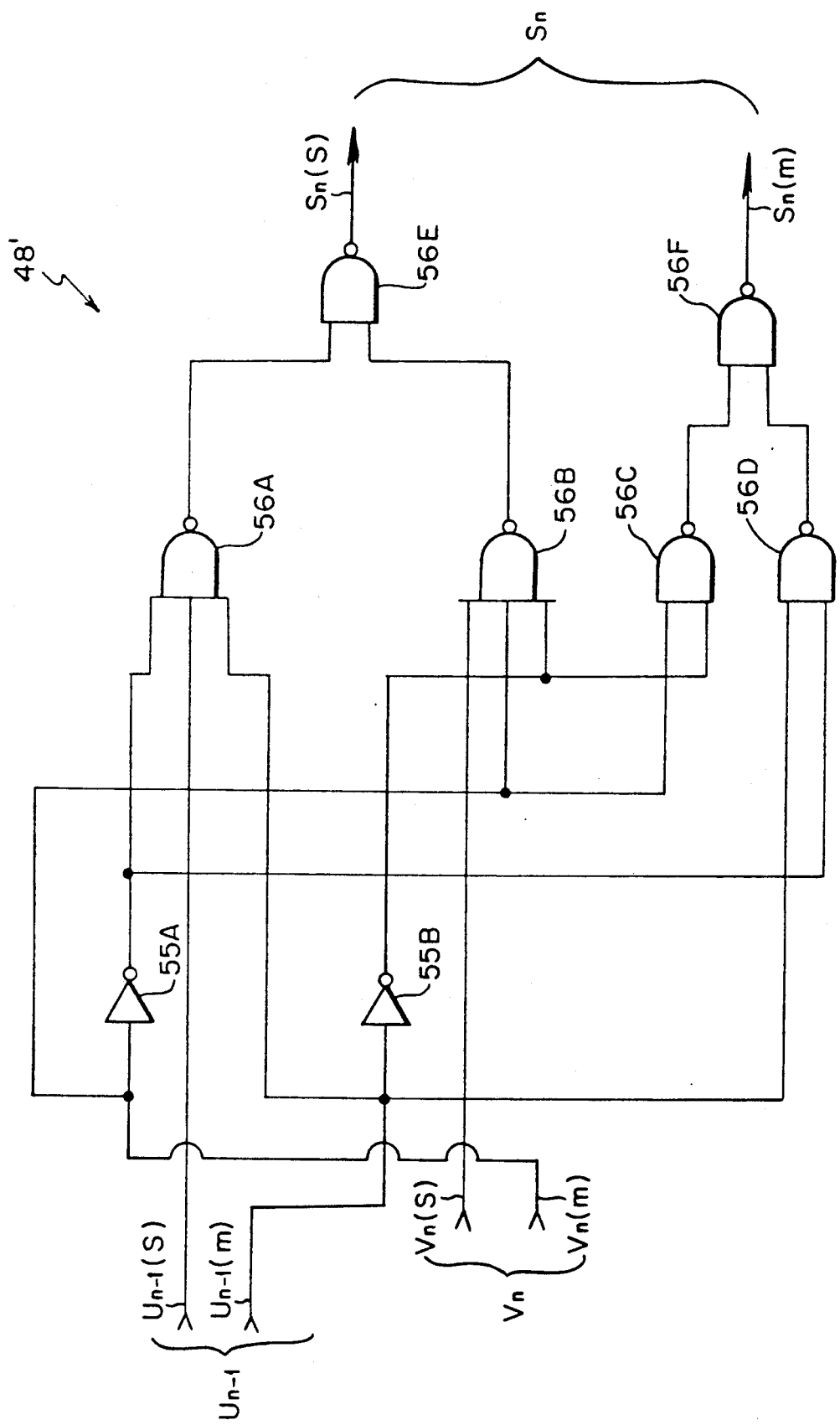

As shown in FIG. 7C, digital logic circuit 48' comprises two inverters 55A and 55B and six NAND gates 56A through 56F. The input of inverter 55A is connected to an input of NAND gate 56B and to an input of NAND gate 56C, whereas the output of inverter 55A is connected to an input of NAND gate 56A and to an input of NAND gate 56D. The input of inverter 55B is connected to an input of NAND gate 56A and to an input of NAND gate 56D, whereas the output of inverter 55B is connected to an input of NAND gate 56B and an input of NAND gate 56C. The outputs of NAND gates 56A and 56B are provided to the inputs of NAND gate 56E, whereas the outputs of NAND gates 56C and 56D are connected to the inputs of NAND gates 56F, so as to configure the abovedescribed logical elements to provide the logic circuit 48'. As illustrated in FIG. 7C, the sign and magnitude bits of digit $v_n$ are provided to an input of NAND gate 56B and the input of inverter 55A, respectively, while the sign and magnitude bits of delayed digit $u_{n-1}$ are provided to an input of NAND gate 56A and the input of inverter 55B, respectively. The sign and magnitude bits of digit $s_n$ are provided from the output of NAND gates 56E and 56F, respectively.

The operation of the on-line serial addition unit 4 hereof will now be described in terms of the logic functions which it performs.

At each n-th cycle of the method of bit-serial processing hereof, the n-th digit of operand C, i.e. $c_n$, is provided to the input of the on-line serial addition unit 4, along with the n-th product digit, $p_n$, provided from the conventional on-line multiplication unit 3 described above. Each of these two digits comprises a sign and magnitude bit, and is operated upon by three logic functions which, only after two computational cycles, produces the most significant digit $s_n$ in signed digit (i.e. sign magnitude) form.

In describing the operation of logic unit 44, logic unit 46 and logic unit 48, reference is made to FIG. 3 in particular. In logic unit 44, signed digits $p_n$ and $c_n$ are provided as input, and result in two outputs $w_n$ and $t_n$ referred to hereinafter as "partial sums". If $p_n + c_n = 0$, then $t_n = 0$. If $p_n + c_n \geq 1$, then $t_n = 1$, and if $p_n + c_n < 0$, then $t_n = -1$. On the other hand, $w_n = (p_n + c_n) - 2 \cdot t_n$ for all other values of $P_n$ and $c_n$ (i.e. otherwise).

Then, during the next subsequent cycle, $w_n$ is delayed by one "digit interval" by delay unit 45 to produce $w_{n-1}$ which, along with $t_n$, is provided to logic unit 46 to produce two partial sums $u_n$ and $v_n$. If $w_{n-1}+p=2$, then $v_n=1$ and if $w_{n-1}+t_n=-2$, then $v_n=-1$. If $w_{n-1}+t_n$ equals any number other than $+2$ or $-2$, then $v_n=0$. On the other hand, $u_n=w_{n-1}-2\cdot v_n$ for all other values of $w_{n-1}$.

Then, after a subsequent cycle, $u_n$ is delayed by one "digit interval" by delay unit 47, to produce $u_{n-1}$ which, along with $v_n$, is provided to logic unit 48 to produce the sum digit $s_n$, which is equal to the sum of $u_{n-1}$ and $v_n$.

Figure 8:
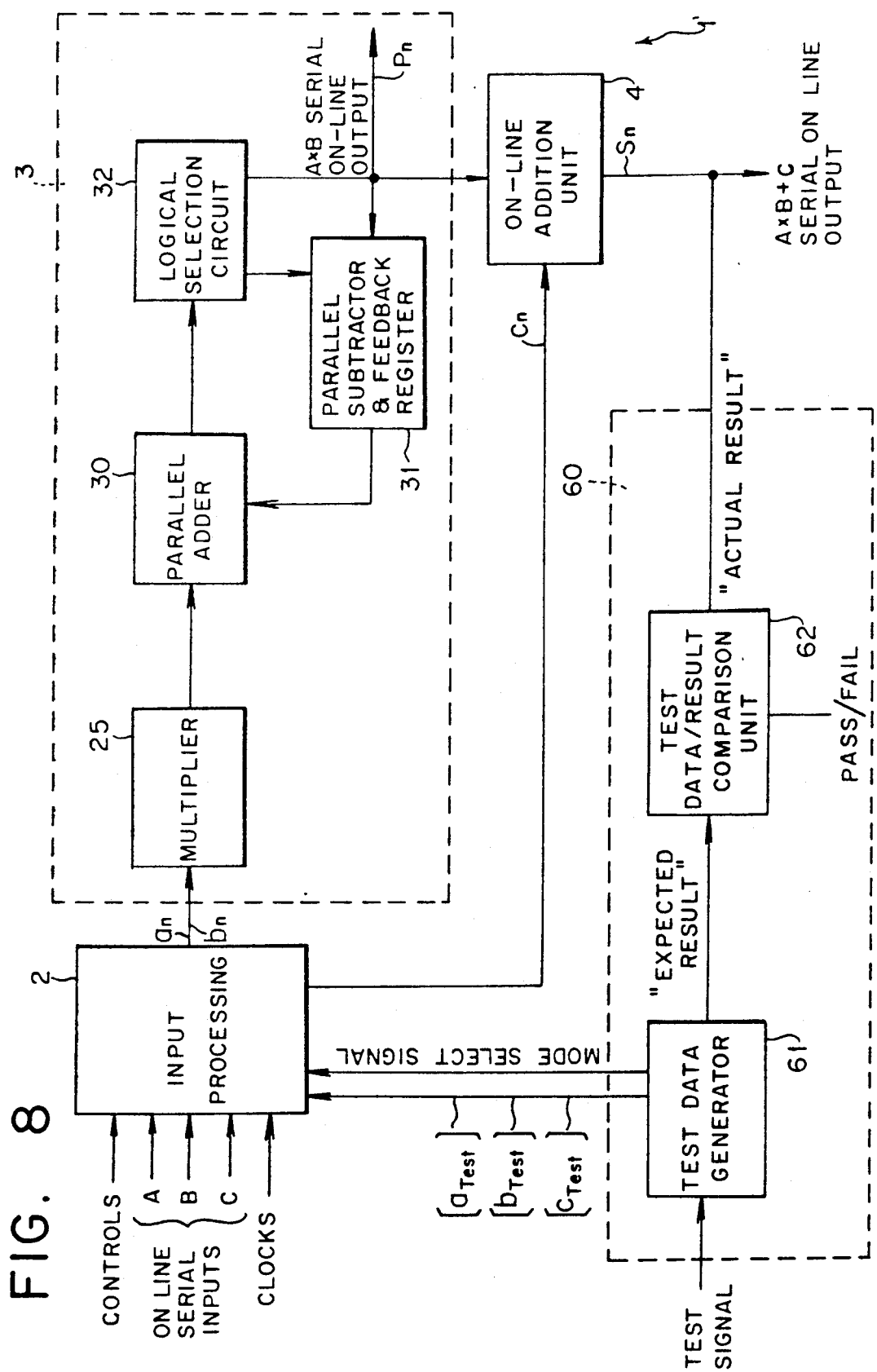
FIG. 8 is a high level functional block diagram of another embodiment of the arithmetic processing unit of FIG. 3, further showing a subsystem for testing the arithmetic performance of the arithmetic processing unit hereof.

Referring now to FIG. 8, a modification to the arithmetic processor hereof will now be described. In general, this embodiment of the arithmetic processor 1' comprises the input processing unit 2, the on-line multiplication unit 3 and the on-line addition unit 4 illustrated in FIGS. 2 and 3 and described in detail above, in addition to an arithmetic performance testing means 60.

In general, the arithmetic performance testing means 60 of the preferred embodiment comprises a test-data generator 61, and a test-data/result comparison unit 62 realizable using known comparitor logic known in the art. The arithmetic performance tester 60 is enabled when a test signal is provided to the test-data generator 61 to render it active. In turn, this causes the arithmetic processor 1' to enter its "self-test mode". Then, the test-data generator 61 disables input data lines from entering on-line data streams $\{a_n\}$ $\{b_n\}$ into the input processing unit 2, by transmitting a mode select signal from the test-data generator 61 to the switching devices 7A of input processing unit 2. Test-data generator 61 then injects serial test pattern data $\{a_{TEST}\}$, $\{b_{TEST}\}$, $\{c_{TEST}\}$ into the input processing section 2. This injected test pattern data can be in conventional binary form, in which case the input processing unit 2 will convert it into binary signed digit format, or it can be already in the binary signed digit format. The test-data/result comparison unit 62, on the other hand, receives the corresponding "expected arithmetic result" from test-data generator 61, and in each case compares this "expected arithmetic result" with the "actual arithmetic result" produced from the output of the on-line addition unit 4. If a mismatch is detected between the expected and actual result, then a pass/fail line is activated to alarm the user of the arithmetic processor of malfunction.

While a single arithmetic processor of the present invention has been disclosed, various architectures can be constructed using the arithmetic processor hereof as a basic "building" block. Thus, when constructing a one-dimensional systolic array, using the arithmetic processor hereof implemented as a microelectronic chip, simply involves cascading a number of such microelectronic chips together so that the output of one stage becomes the input of the next stage.

As discussed hereinbefore, all internal arithmetic computations are carried out in signed-digit data format, and the output data of each arithmetic processor hereof will always be in signed-dibit format as well. Thus, in such an application where a number of such microelectronic chips are cascaded together, there will be input data expressed in the signed digit redundant format, for all stages, (except possibly the first stage, which, when "regular" binary data is provided as input, data format conversion will be required).

While the particular embodiment shown and described above has proven to be useful in many applications involving the arithmetic processing arts, further modifications herein disclosed will occur to persons skilled in the art to which the present invention pertains and all such modifications are deemed to be within the scope and spirit of the present invention defined by the appended claims.

What is claimed is:

1. Method of processing input logic signals representing the operands A, B and C, in signal processing logic circuit, produce an output logic signal representing the value of the arithmetic expressions $S=(A\times B)+C$, the input signals representing operands A, B and C having a sequence of logic states corresponding to logic data bits represented by $(a_0, a_1, \ldots a_n \ldots, a_{N-1})$, $(b_0, b_1, \ldots b_n \ldots, b_{N-1})$ and $(c_0, c_1, \ldots c_n \ldots, c_{N-1})$ respectively, with the most significant logic data bit $a_0$, $b_0$, and $c_0$, of each operand-representing input signal entering the signal processing logic circuit first, and where N is an integer, said method of logic signal processing comprising the sequence of steps:

(a) sequentially introducing into said signal processing logic circuit said input logic signals representing operands A, B and C with the logic data bits arranged in a redundant binary number format;

(b) multiplying said logic data bits of said input logic signals representing operands A and B using an on-line multiplication process in a multiplication logic circuit to produce an n-th product logic data bit $p_n$ of a product signal representing the product $P=A\times B$, the product signal including a sequence of logic states corresponding to logic data bits represented by $(p_0, p_1, \ldots p_n)$ with a most significant digit $p_0$ being computed first by the multiplication logic circuit and where $p_n$ is the n-th logic data bit of the product signal;

(c) adding said n-th product logic data bit of the product signal to an n-th logic data bit of the input logic signal representing operand C in an addition circuit using an on-line addition process so as to produce an n-th logic data bit $s_n$ of an output logic signal representing the arithmetic expressions $S=(A\times B)+C$, the output logic signal including a sequence of logic states corresponding to logic data bits represented by $(s_0, s_1, \ldots s_n)$, a most significant logic data bit $s_0$ of the output logic signal being produced first; and (d) repeating steps (a), (b) and (c) N times so as to produce the output logic signal.

2. The method of claim 1, wherein step (a) further comprises selectively converting the input logic signals representing operands A, B and C in a converter circuit so that each said logic data bit is represented in the redundant binary number format.

3. A signal processing logic circuit for processing input logic signals representing operands A, B and C to produce an output logic signal representing the arithmetic expressions $S=(A\times B)+C$, the input signals representing operands A, B and C having a sequence of logic states corresponding to logic data bits represented by $(a_0, a_1, \ldots a_n \ldots, a_{N-1})$, $(b_0, b_1, \ldots b_n \ldots, b_{N-1})$ and $(c_0, c_1, \ldots c_n \ldots, c_{N-1})$, respectively, with the most significant logic data bit $a_0$, $b_0$, and $c_0$ of each operand-representing input signal entering the signal processing logic circuit first, and where N is an integer, said signal processing logic circuit comprising:

an input processing circuit responsive to the input logic signals for sequentially introducing said logic data bits of the input signals representing operands A, B and C into said signal processing logic circuit, wherein said logic data bits are arranged in a redundant binary number format;

an on-line multiplication circuit coupled to the input processing circuit for multiplying said logic data bits of said input logic signals representing operands A and B to produce an n-th logic data bit $p_n$ of a product signal representing the product $P = A \times B$, the product signal including a sequence of logic states corresponding to logic data bits represented by $(p_0, p_1, \ldots, p_n)$ with a most significant digit $p_0$ being computed first by the multiplication circuit; and an on-line addition circuit coupled to the multiplication circuit for adding the n-th product logic data bit $p_n$ to an n-th logic data bit of the input logic signal representing operand C, so as to produce an n-th logic data bit $s_n$ of an output logic signal representing the arithmetic expression $S = (A \cdot B) + C$, the output logic signal including a sequence of logic states corresponding to logic data bits represented by $(s_0, s_1, \ldots, s_n)$, a most significant logic data bit $s_0$ of the output logic signal being produced first.

4. A signal processing logic circuit as defined by claim 3, wherein said input processing circuit comprises a selective conversion circuit for selectively converting the input logic signals representing operands A, B and C so that each said logic data bit is represented in the redundant binary number format.

5. A signal processing logic circuit as defined by claim 4, which further comprises:

a word length control circuit for maintaining the word length of each input logic signal to N logic data bits, the word length control circuit being coupled to the selective conversion circuit.

6. A signal processing logic circuit as defined by claim 5, wherein said word length control circuit comprises:

a detecting circuit for detecting the presence of a first pattern of the logic data bits of the input logic signals representing operands A, B and C, and for transforming the detected first pattern of logic data bits into a second pattern of logic data bits, the logic data bits of the second pattern being in the redundant binary number format.

7. A signal processing logic circuit as defined by claim 3, which further comprises a performance testing circuit for testing the performance of the signal processing logic circuit, the performance testing circuits being coupled to the input processing circuit and receiving the output logic signal, and being responsive to a predetermined test signal provided to said input processing circuit.

8. A signal processing logic circuit as defined by claim 7, wherein said performance testing circuit comprises:

a test-data generating circuit for generating a test signal to be provided to said input processing circuit so as to obtain a predetermined output logic signal from said on-line addition circuit based on said test signal, said test-data generating circuit further providing an expected result signal based on said test signal; and a test-data/result comparison circuit for comparing said predetermined output logic signal obtained from said on-line addition circuit, with said expected result signal obtained from said test-data generating circuit, and generating an alarm signal when said predetermined output logic signal differs from said expected result signal.

* * * * *